United States Patent
Yasuda

(10) Patent No.: US 11,305,494 B2
(45) Date of Patent: Apr. 19, 2022

(54) MANUFACTURING METHOD OF ASSEMBLY

(71) Applicant: FUTABA INDUSTRIAL CO., LTD., Okazaki (JP)

(72) Inventor: Keigo Yasuda, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 84 days.

(21) Appl. No.: 16/808,870

(22) Filed: Mar. 4, 2020

(65) Prior Publication Data

US 2020/0316872 A1    Oct. 8, 2020

(30) Foreign Application Priority Data

Apr. 3, 2019  (JP) .............................. JP2019-071352

(51) Int. Cl.
*B29C 65/48*     (2006.01)
*B29C 65/00*     (2006.01)
*F16L 3/127*     (2006.01)
*B29L 23/00*     (2006.01)
*B29K 307/04*    (2006.01)

(52) U.S. Cl.
CPC .......... *B29C 65/48* (2013.01); *B29C 66/5324* (2013.01); *B29C 66/7212* (2013.01); *B29C 66/7422* (2013.01); *F16L 3/127* (2013.01); *B29K 2307/04* (2013.01); *B29L 2023/22* (2013.01)

(58) Field of Classification Search
None
See application file for complete search history.

(56) References Cited

U.S. PATENT DOCUMENTS 2,794,481 A * 6/1957 Anderson ............... B29C 33/02
                                                                156/163
2018/0281711 A1* 10/2018 Khan ...................... B60R 19/03

FOREIGN PATENT DOCUMENTS

| JP | S5378282 A | 7/1978 |
| JP | 6-2789 A * | 1/1984 |
| JP | H062789 A | 1/1994 |
| JP | 2005-265129 A * | 9/2005 |
| JP | 2016221784 A | 12/2016 |

OTHER PUBLICATIONS

Machine Translation of Japanese Patent 6-2789, Date Unknown.*

(Continued)

*Primary Examiner* — Jeffry H Aftergut
(74) *Attorney, Agent, or Firm* — Withrow & Terranova, P.L.L.C.; Vincent K. Gustafson

(57) ABSTRACT

In a manufacturing method of an assembly, the assembly including a metal part and a pipe, the pipe including a material containing a resin, an adhesive is first adhered to an outer circumferential surface of the pipe and a metal part covering at least a portion of an outer circumferential surface of the pipe. Here, an area to which the adhesive is adhered on the outer circumferential surface of the pipe is defined as an adhesion area. Next, by a heat source provided inside the pipe, a target area is heated without interposing the metal part. The target area is located radially interior to the adhesion area and located on an inner circumferential surface of the pipe.

10 Claims, 3 Drawing Sheets

(56) References Cited

OTHER PUBLICATIONS

Machine Translation of Japanese Patent 2005-265129, Date Unknown.*
Notice of Reasons for Refusal for Japanese Patent Application No. 2019-071352, dated Feb. 2, 2021, 4 pages.
First Office Action for Chinese Patent Application No. 202010164593.0 dated Sep. 1, 2021, 12 pages including English translation.
Second Office Action for Chinese Patent Application No. 202010164593.0 dated Jan. 20, 2022, 11 pages including English translation.

* cited by examiner

MANUFACTURING METHOD OF ASSEMBLY

CROSS-REFERENCE TO RELATED APPLICATIONS

This application claims the benefit of Japanese Patent Application No. 2016-071352 filed on Apr. 3, 2019 with the Japan Patent Office, the entire disclosure of which is incorporated herein by reference.

BACKGROUND

The present disclosure relates to a manufacturing method of an assembly having a resin pipe and a metal part.

In some automobiles, especially automobiles required to reduce weight such as racing cars, a carbon fiber reinforced plastic (CFRP) pipe (hereinafter, a CFRP pipe) is used as a material for a vehicle body. The CFRP pipe is used in a state of being adhered to a metal part with an adhesive and the like.

Japanese Unexamined Patent Application Publication No. 2016-221784 (Patent Document 1) discloses a method to adhere a CFRP pipe and a metal part. In the method, the metal part is inserted to an end of the CFRP pipe, and an adhesive is filled in a gap between the CFRP pipe and the metal part. Then the adhesive is heated by a heat source provided in the metal part, and the adhesive is hardened, whereby the CFRP pipe and the metal part are bonded.

SUMMARY

However, in the manufacturing method according to the above document, since the heat source is provided in the metal part, the metal part is expanded due to a heating of the adhesive. Then, when the expanded metal part is cooled and shrunk, the adhesive might be peeled off.

In one aspect of the present disclosure, it is preferable to inhibit a peeling of the adhesive.

One aspect of the present disclosure is to provide a manufacturing method of an assembly, the assembly including a pipe and a metal part, the pipe including a material containing a resin, the method including adhering an adhesive to an outer circumferential surface of the pipe and the metal part covering at least a portion of the outer circumferential surface of the pipe. Here, an area to which the adhesive is adhered on the outer circumferential surface of the pipe is defined as an adhesion area. By a heat source provided in the pipe, a target area is heated without interposing the metal part, the target area being located radially interior to the adhesion area and located on an inner circumferential surface of the pipe.

In one aspect of the present disclosure, the resin may be a CFRP.

With this configuration, it is possible to heat the adhesive while inhibiting a heating of the metal part. Thus, an expansion of the metal part can be reduced. Consequently, the peeling of the adhesive caused by the heating of the metal part can be inhibited.

In one aspect of the present disclosure, the metal part may surround the outer circumferential surface of the pipe.

With this configuration, the peeling of the adhesive caused by the heating of the metal part can be inhibited.

In one aspect of the present disclosure, the metal part may have a through hole penetrating the metal part, and the pipe may be inserted into the through hole.

With this configuration, the peeling of the adhesive caused by the heating of the metal part can be inhibited.

In one aspect of the present disclosure, a thermal expansion coefficient of the metal part may be larger than a thermal expansion coefficient of the pipe.

In one aspect of the present disclosure, the metal part may comprise aluminum.

With this configuration, even if a metal part having a thermal expansion coefficient larger than a thermal expansion coefficient of the pipe is used, a suitable adhesion may be achieved.

In one aspect of the present disclosure, the metal part may be arranged on an end of the pipe.

With this configuration, the heat source is easy to reach the target area located radially interior to the adhesion area and located on the inner circumferential surface of the pipe. Thus, the heating of the adhesive can be suitably performed.

In one aspect of the present disclosure, the heat source may be hot wind flowing into an inside of the pipe.

With this configuration, it is possible to heat the adhesive while inhibiting the heating of the metal part. Thus, an expansion of the metal part can be reduced.

In one aspect of the present disclosure, the heat source may be configured to be expanded by high-temperature air injected into the heat source. A heating of the target area is performed by injecting the high-temperature air into the heat source provided in the pipe to expand the heat source, and by pressurizing the target area by the heat source that is expanded, the target area being located radially interior to the adhesion area and located on the inner circumferential surface of the pipe.

With this configuration, the heat source expanded by the high-temperature air heats with pressure the target area located radially interior to the adhesion area and located on the inner circumferential surface of the pipe. Thus, the pipe and the metal part can be more strongly bonded.

In one aspect of the present disclosure, the assembly may be included in a body structure of an automobile.

With this configuration, the peeling of the adhesive may be inhibited in the part included in the body structure of the automobile.

BRIEF DESCRIPTION OF THE DRAWINGS

Hereinafter, exemplary embodiments of the present disclosure will be described with reference to the accompanying drawings, in which.

DETAILED DESCRIPTION OF EXEMPLARY EMBODIMENTS

Embodiments of the present disclosure may not be limited to the below embodiments, and can be variously modified within the technical scope of the present disclosure.

1. First Embodiment

[Configuration]

Figure 1:
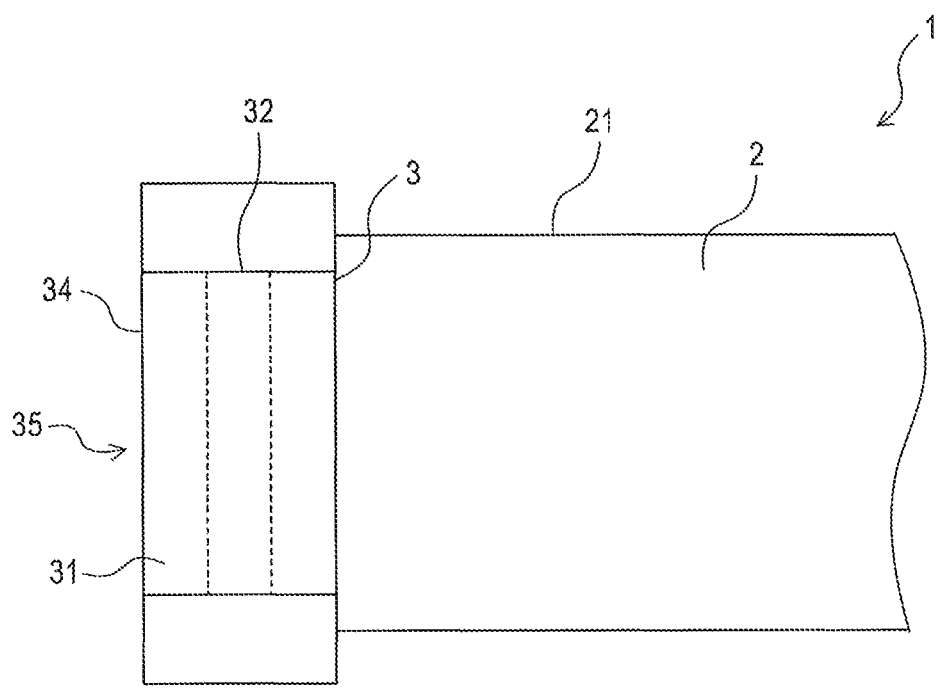
FIG. 1 is a schematic lateral surface view of an assembly manufactured in a first embodiment.
Figure 2:
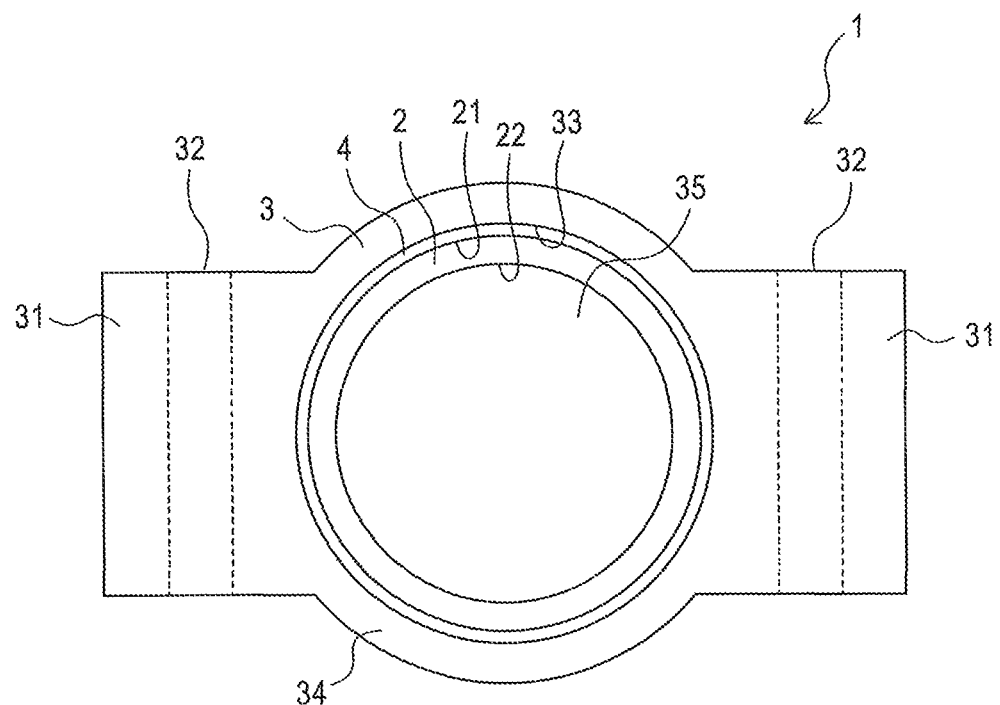
FIG. 2 is a schematic front view of an assembly manufactured in the first embodiment.

As shown FIGS. 1 and 2, an assembly 1 of the present embodiment includes a pipe 2 and a metal part 3.

The pipe 2 is configured by a material containing a resin. Specifically, the pipe 2 may include a CFRP. Also, the pipe 2 may include a fiber reinforced plastic (FRP). Furthermore, in addition to the resin, the pipe 2 may include a material different from the resin.

The pipe 2 has a substantially circular cross section (hereinafter, referred to as a pipe section) orthogonal to an extending direction of the pipe 2. The pipe section may have a radius of about 35 to 40 mm, for example. A part or all of the pipe 2 may have a pipe section different from the substantially circular shape. The shape of the pipe section may be substantially quadrangle or substantially trapezoid.

The metal part 3 has a thermal expansion coefficient larger than that of the pipe 2. As one example, a metal composing the metal part 3 is aluminum. However, any other metals may be used to compose the metal part 3 if the thermal expansion coefficient of the metal part 3 becomes larger than the thermal expansion coefficient of the pipe 2. The metal part 3 has two projections 31 formed thereon, and each projection 31 has a hole 32 formed therein. The hole 32 can be inserted by a bolt or the like to fix the assembly 1.

The assembly 1 may be used, for example, as an automobile part. More specifically, the assembly 1 may be, for example, a part (for example, an instrument panel reinforcement) included in a body structure of a vehicle. The instrument panel reinforcement is a long and thin part extending in a width direction of the automobile and arranged near an instrument panel of the automobile. The metal part 3 can be used as a bracket in the instrument panel reinforcement in order to be connected to other parts.

Use of the assembly 1 as an automobile part reduces the weight of a vehicle body in an automobile in demand for weight reduction.

The metal part 3 has a through hole 35 penetrating the metal part 3 and formed on an end face 34 thereof. In the through hole 35, the pipe 2 is inserted, and the pipe 2 and the metal part 3 are bonded by an adhesive 4. The adhesive 4 is adhered to an outer circumferential surface 21 of the pipe 2 and an inner circumferential surface 33 of the through hole 35 of the metal part 3. That is, the adhesive 4 is arranged between the outer circumferential surface 21 of the pipe 2 and the inner circumferential surface 33 of the through hole 35 of the metal part 3.

The adhesive 4 is an epoxy based one-pack thermosetting adhesive. The type of the adhesive 4 may not be limited to a specific type, and various types can be used.

A manufacturing method of the assembly 1 includes an adhesion and arrangement process and a heating process. Hereinafter, each process will be described.

[Adhesion and Arrangement Process]

Figure 3:
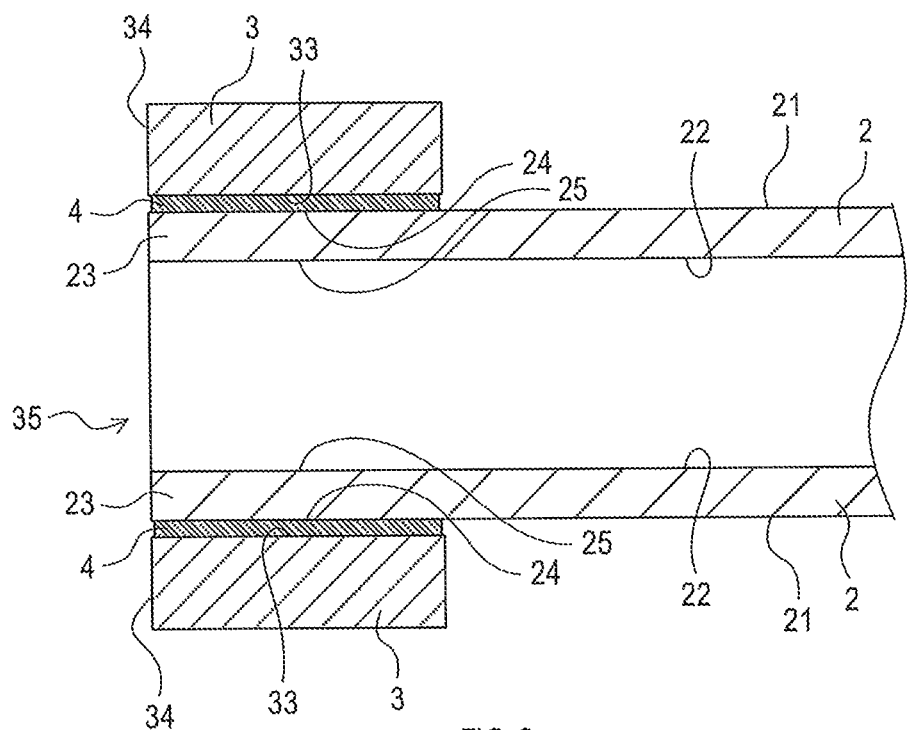
FIG. 3 is a schematic sectional view along an extending direction of a pipe showing a pipe and a metal part arranged in an adhesion and arrangement process in the first embodiment.

As shown in FIG. 3, in the adhesion and arrangement process, the adhesive 4 is adhered to the outer circumferential surface 21 of the pipe 2 inserted into the through hole 35 of the metal part 3 and the inner circumferential surface 33 of the through hole 35 of the metal part 3. In adhering the adhesive 4, various steps can be taken.

That is, the adhesive 4 may be first applied to the outer circumferential surface 21 of the pipe 2, and then the pipe 2 may be inserted into the metal part 3. At this time, the adhesive 4 applied to the pipe 2 may be adhered to the inner circumferential surface 33 of the metal part 3.

Conversely, the adhesive 4 may be first applied to the inner circumferential surface 33 of the metal part 3, and then pipe 2 may be inserted into the metal part 3. At this time, the adhesive 4 applied to the inner circumferential surface 33 of the metal part 3 may be adhered to the outer circumferential surface 21 of the pipe 2.

Furthermore, the pipe 2 may be first inserted into the metal part 3, and then the adhesive 4 may be injected into a gap between the outer circumferential surface 21 of the pipe 2 and the inner circumferential surface 33 of the metal part 3. At this time, the injected adhesive 4 may be adhered to the outer circumferential surface 21 of the pipe 2 and the inner circumferential surface 33 of the metal part 3.

Note that the adhesive 4 may be arranged in a whole area of the gap between the outer circumferential surface 21 of the pipe 2 and the inner circumferential surface 33 of the metal part 3. Alternatively, the adhesive 4 may be arranged in a part of the gap. Hereinafter, an area to which the adhesive 4 is adhered on the outer circumferential surface 21 of the pipe 2 is referred to as an adhesion area 24.

The metal part 3 is arranged on an end 23 of the pipe 2. As one example, the end 23 of the pipe 2 is located so as to be adjacent to a rim surrounding the through hole 35 in the end face 34 of the metal part 3. In other words, the end 23 of the pipe 2 and the end face 34 of the metal part 3 are positioned on a substantially same plane.

In addition, for example, the metal part 3 may be arranged on a portion other than the end 23 of the pipe 2 (for example, on a central portion in an extending direction of the pipe 2). In other words, the pipe 2 may protrude from the end face 34 of the metal part 3. Conversely, the position of the pipe 2 may be adjusted so that the end 23 of the pipe 2 is recessed with respect to the end face 34 of the metal part 3.

[Heating Process]

Figure 4:
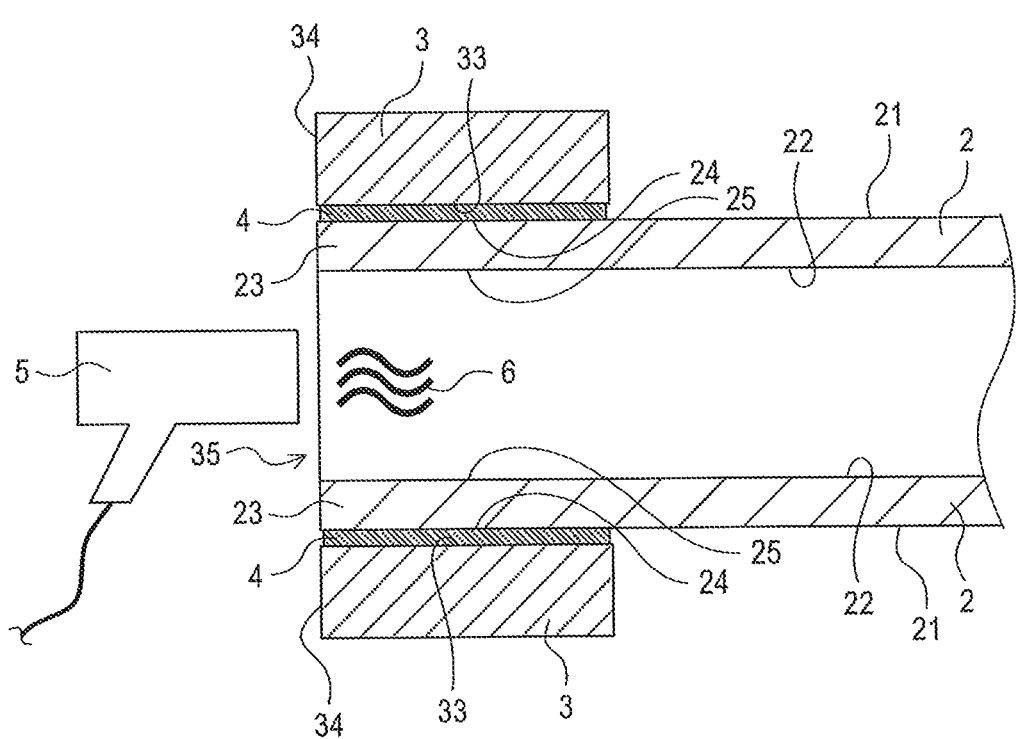
FIG. 4 is a schematic sectional view along the extending direction of the pipe showing a heating process in the first embodiment.

After the adhesion and arrangement process, a heating process is performed. In the heating process, as shown in FIG. 4, hot wind flows inside the pipe 2 by use of a blower 5. The incoming hot wind is used as a heat source 6 to heat a target area 25 on the inner circumferential surface 22 of the pipe 2. Specifically, by making the hot wind flow into the target area 25, the hot wind (the heat source 6) directly heats the target area 25 of the pipe 2 without interposing other members such as the metal part 3. Note that the target area 25 is an area located radially interior to the adhesion area 24. Such heating thermally cures the adhesive 4 adhered to the adhesion area 24. Accordingly, the pipe 2 and the metal part 3 are bonded together with the adhesive 4, whereby the assembly 1 is formed.

The incoming hot wind flows only toward the inside of the pipe 2; thus, the outer circumferential surface 21 of the pipe 2 is not directly heated by the hot wind. Thus, a temperature difference may occur in which a temperature of the inner circumferential surface 22 of the pipe 2 is high and a temperature of the outer circumferential surface 21 of the pipe 2 is lower than the inner circumferential surface 22. Accordingly, the target area 25 is heated without interposing the metal part 3 and the like.

As one example, in the heating process, a temperature of the heat source 6 may be about 60° C., and heating time by the heat source 6 may be about 90 minutes.

Also, as a heating method by a heat source, various means can be used. For example, the target area 25 of the pipe 2 may be heated by arranging a heater inside the pipe 2 so as to face the target area 25. Examples of the heater used here may include various heaters such as an electric heater. Also in this case, the heater is arranged only inside the pipe 2, thereby directly heating the target area 25 of the pipe 2.

[Effect]

According to the first embodiment, the following effects can be achieved.

(a) As described above, in the heating process, the target area 25 of the pipe 2 is directly heated from the inside of the pipe 2. Thus, it is possible to heat the adhesive 4 while inhibiting the metal part 3 from being heated, which reduces the expansion of the metal part 3. Therefore, a peeling of the adhesive 4 caused by the expansion of the metal part 3 can be inhibited.

(b) As described above, the expansion of the metal part 3 caused by heating can be reduced. Thus, even if a metal part 3 having a thermal expansion coefficient larger than that of the pipe 2 is used as in the case of the metal part 3 made of aluminum, such metal part 3 can be suitably bonded.

The metal part 3 is arranged so as to cover the outer circumferential surface 21 of the pipe 2. Thus, even if the metal part 3 is expanded as the target area 25 of the pipe 2 is heated, the metal part 3 shrinks toward the outer circumferential surface 21 of the pipe 2 as the metal part 3 is cooled. Thus, less gap is generated between the pipe 2 and the metal part 3, and the peeling of the adhesive 4 can be inhibited.

(c) Also, a manufacturing cost can be reduced compared to the case where the whole of the pipe 2 and the metal part 3 are heated by use of a heating furnace or the like to thermally cure the adhesive 4.

2. Second Embodiment

Next, a manufacturing method of the assembly 1 in a second embodiment will be described. The manufacturing method of the second embodiment is different in a heating process, but an adhesion and arrangement process is similar to the first embodiment. Hereinafter, a heating process will be described.

Figure 5:
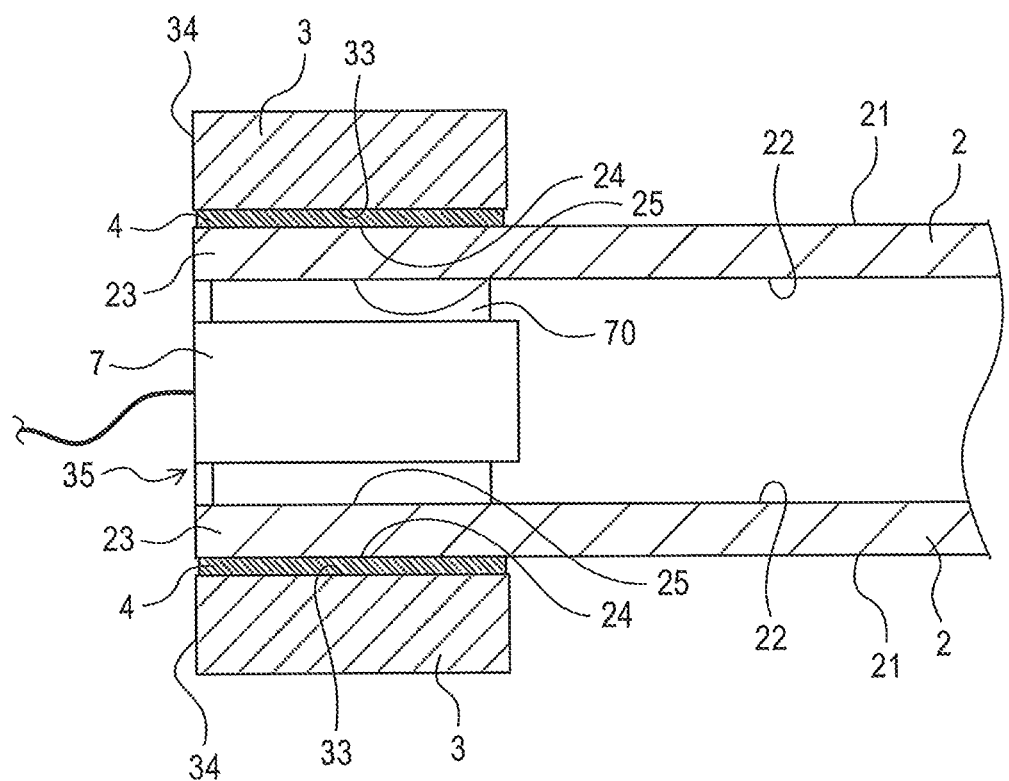
FIG. 5 is a schematic sectional view along the extending direction of the pipe showing a heating process in a second embodiment.

In the heating process of the second embodiment, a heat source 7 configured to be expanded by high-temperature air injected inside the heat source 7 is used (see FIG. 5). The heat source 7 has an expansion portion 70 arranged so as to surround a lateral surface of the heat source 7. The expansion portion 70 is formed by an elastic material, and expands laterally by the air injected into the heat source 7.

As shown in FIG. 5, the heat source 7 is arranged inside the pipe 2. At this time, the expansion portion 70 faces the target area 25 along the entire periphery of an inner circumferential surface 22 of the pipe 2. When the high-temperature air is injected inside the heat source 7, the expansion portion 70 is expanded toward the inner circumferential surface 22 of the pipe 2 by air pressure. The expanded expansion portion 70 comes in contact with the target area 25 of the pipe 2 along the entire periphery thereof. Accordingly, the expansion portion 70 pressurizes the target area 25 of the pipe 2 from the inside of the pipe 2 and heats the target area 25 by the high-temperature air.

Note that the expansion portion 70 does not necessarily come in contact with the whole area of the target area 25 of the pipe 2, and the expansion portion 70 may partially come in contact with the target area 25 if the expansion portion 70 can sufficiently pressurize the target area 25.

[Effect]

According to the second embodiment, the effects of the first embodiment can be obtained, and the following effects can be further achieved.

(a) In the heating process of the second embodiment, the expansion portion 70 of the heat source 7 expanded by the high-temperature air heats the target area 25 of the pipe 2 while pressurizing the target area 25. Thus, the pipe 2 and the metal part 3 are more strongly bonded with each other.

3. Other Embodiment

Although the embodiments of the present disclosure have been described so far, the present disclosure is not limited to the above-described embodiments, and can be practiced in various forms.

(a) In the above embodiments, a configuration is described in which one metal part 3 is arranged on the end 23 of the pipe 2; however, in the pipe 2, two or more metal parts 3 may be arranged.

Also, in the above embodiments, a configuration is exemplary described in which the pipe 2 is inserted into the through hole 35 of the metal part 3, and the metal part 3 covers the outer circumferential surface 21 of the pipe 2 along the entire periphery; however, the configuration is not limited to this. The metal part 3 may be formed by one part or a plurality of parts covering a portion of the outer circumferential surface 21 without surrounding the outer circumferential surface 21 of the pipe 2 in a circumferential direction. Also, the metal part 3 may be formed by a plurality of parts surrounding the outer circumferential surface 21 of the pipe 2 along the entire periphery thereof.

(b) In the above embodiments, a configuration is exemplary described in which the adhesive 4 is the epoxy based one-pack thermosetting adhesive; however, the configuration is not limited to this. The adhesive 4 is preferably a thermosetting resin; however, any adhesive may be used if the adhesive is facilitated to be cured by heating. For example, a two-pack room temperature curing adhesive can be used. Also, as a material for the adhesive, any of a urethane, acrylic, or epoxy based material may be used.

(c) In the above embodiments, the inner circumferential surface 33 of the metal part 3 may be provided with a hole or cut-out to temporarily fasten the metal part 3 to the pipe 2. Also, in the adhesion and arrangement process, for example, a screw may be first inserted into the hole to temporarily fasten the pipe 2 to the metal part 3, and then, the adhesive 4 may be filled.

(d) In the above embodiments, the pipe 2 may be provided with any parts other than the metal part 3. The pipe 2 may be provided with any portions (for example, a plane seat or a hole portion) to attach various parts on the outer circumferential surface 21. Also, the pipe 2 may include two or more portions having different diameters and the pipe 2 may include one or more connecting parts to connect the two or more portions.

(e) The function(s) performed by a single element in the above embodiments may be performed by two or more elements. The function(s) performed by two or more elements may be integrated into a single element. A part of the configuration of the above embodiments may be omitted. At least a part of the configuration of the above embodiments may be added to or replaced in the configuration of the above-described other embodiments. Any modes encompassed by technical ideas specified by claim language are embodiments of the present disclosure.

What is claimed is:

1. A manufacturing method of an assembly, the assembly including a pipe and a metal part, the pipe including a material containing a resin, comprising:

adhering an adhesive to an outer circumferential surface of the pipe and an inner circumferential surface of the metal part covering at least a portion of the outer circumferential surface of the pipe; and heating a target area by a heat source provided in the pipe without interposing the metal part, the target area being located radially interior to an adhesion area and located on an inner circumferential surface of the pipe, the adhesion area being an area to which the adhesive is adhered on the outer circumferential surface of the pipe, wherein the metal part is configured for use as a bracket connected to an other part that is distinct from the pipe and the metal part, and wherein the inner circumferential surface of the metal part registered with the adhesive area is devoid of a hole or cut-out formed in a radial direction for receiving a fastener for fastening the metal part to the pipe.

2. The manufacturing method of the assembly according to claim 1,
wherein the resin is a carbon fiber reinforced plastic.

3. The manufacturing method of the assembly according to claim 1,
wherein the metal part surrounds the outer circumferential surface of the pipe.

4. The manufacturing method of the assembly according to claim 1,
wherein the metal part includes a through hole penetrating the metal part in a direction parallel to an extending direction of the pipe, and the pipe is inserted into the through hole.

5. The manufacturing method of the assembly according to claim 1,
wherein a thermal expansion coefficient of the metal part is larger than a thermal expansion coefficient of the pipe.

6. The manufacturing method of the assembly according to claim 1,
wherein the metal part is composed of aluminum.

7. The manufacturing method of the assembly according to claim 1,
wherein the metal part is arranged on an end of the pipe.

8. The manufacturing method of the assembly according to claim 1,
wherein the heat source comprises a heated gas flowing into an inside of the pipe.

9. The manufacturing method of the assembly according to claim 1,
wherein the heat source is configured to be expanded by high-temperature air injected into the heat source,
wherein a heating of the target area is performed by
injecting the high-temperature air into the heat source provided in the pipe to expand the heat source, and
pressurizing the target area by the heat source that is expanded, the target area being located radially interior to the adhesion area and located on the inner circumferential surface of the pipe.

10. The manufacturing method of the assembly according to claim 1, wherein the assembly is included into a body structure of an automobile.

* * * * *